United States Patent
Kamp et al.

(10) Patent No.: US 9,273,795 B2
(45) Date of Patent: Mar. 1, 2016

(54) REVERSE FLOW RELIEF VALVE

(71) Applicant: Hamilton Sundstrand Corporation, Windsor Locks, CT (US)

(72) Inventors: Josh Kamp, Glastonbury, CT (US); Scott W Simpson, Easthampton, MA (US); John M Dehais, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 335 days.

(21) Appl. No.: 13/915,783

(22) Filed: Jun. 12, 2013

(65) Prior Publication Data

US 2014/0366964 A1 Dec. 18, 2014

(51) Int. Cl.
- *F16K 31/12* (2006.01)
- *F16K 31/124* (2006.01)
- *F02C 9/18* (2006.01)

(52) U.S. Cl.
CPC ............... *F16K 31/1245* (2013.01); *F02C 9/18* (2013.01); *Y10T 137/7759* (2015.04)

(58) Field of Classification Search
CPC ..... F16K 31/122; F16K 31/1245; F02C 9/18; Y10T 137/7759; Y10T 137/776; Y02T 50/56
See application file for complete search history.

(56) References Cited

U.S. PATENT DOCUMENTS

| | | | | |
|---|---|---|---|---|
| 2,723,615 A * | 11/1955 | Morris et al. | | 454/73 |
| 3,769,998 A * | 11/1973 | Avant | | 137/116.5 |
| 4,014,510 A * | 3/1977 | Smith | | 251/63 |
| 4,671,318 A | 6/1987 | Benson | | |
| 4,718,308 A | 1/1988 | Haley | | |
| 5,685,490 A | 11/1997 | Ausman et al. | | |
| 6,280,408 B1 | 8/2001 | Sipin | | |
| 6,361,458 B1 | 3/2002 | Smith | | |
| 8,360,097 B2 * | 1/2013 | Tanner et al. | | 137/492.5 |
| 8,375,984 B2 | 2/2013 | Wilcox | | |
| 2003/0111622 A1 | 6/2003 | Jahn et al. | | |
| 2003/0192595 A1 * | 10/2003 | Benson | | 137/488 |
| 2012/0199211 A1 * | 8/2012 | Schroder et al. | | 137/14 |
| 2012/0304663 A1 | 12/2012 | Weber et al. | | |
| 2013/0276892 A1 * | 10/2013 | Kamp et al. | | 137/1 |

FOREIGN PATENT DOCUMENTS

| | | |
|---|---|---|
| EP | 2808494 A1 | 12/2014 |
| FR | 1300110 A | 8/1962 |

OTHER PUBLICATIONS

European Search Report, dated Jan. 30, 2015, for European Application No. 14164530.9, 5 pages.

* cited by examiner

*Primary Examiner* — Jessica Cahill
(74) *Attorney, Agent, or Firm* — Kinney & Lange, P.A.

(57) ABSTRACT

A bleed valve system includes a bleed valve, a valve regulator, a valve actuator and a reverse flow relief valve. The bleed valve is opened and closed to control a flow of bleed air from an upstream inlet to a downstream outlet. The valve regulator provides a servo pressure used to regulate the position of the bleed valve, and the valve actuator is mechanically connected to open/close the bleed valve based on the servo pressure provided by the valve regulator. The reverse flow relief valve compares a pressure upstream of the bleed valve to a pressure downstream of the bleed valve and in response to the downstream pressure exceeding the upstream pressure creates a fluid communication path between the servo pressure and an ambient pressure to decrease the servo pressure such that the bleed valve is closed.

15 Claims, 2 Drawing Sheets

REVERSE FLOW RELIEF VALVE

BACKGROUND

The present invention is related to valves and in particular to a reverse flow relief valve employed in a bleed air system.

Aircraft systems rely, at least in part, on the pneumatic power provided by bleed air taken from the aircraft engines to do work on the aircraft. Complex systems of valves and ducts communicate and regulate the supply of bleed air from the engine to various components around the aircraft, including the environmental control systems (ECS). Values are used to regulate the supply of bleed air from the engine(s) (i.e., upstream source) to various pneumatic loads (i.e., downstream loads). During normal operation, a valve may be selectively opened/closed to regulate the downstream pressure as desired. However, during some fault conditions the downstream pressure may be greater than the upstream pressure, resulting in a reverse flow of pressurized air into the engine. This reverse flow can be detrimental to engine operation.

SUMMARY

A bleed valve system includes a bleed valve, a valve regulator, a valve actuator and a reverse flow relief valve. The bleed valve is opened and closed to control a flow of bleed air from an upstream inlet to a downstream outlet. The valve regulator provides a servo pressure used to regulate the position of the bleed valve, and the valve actuator is mechanically connected to open/close the bleed valve based on the servo pressure provided by the valve regulator. The reverse flow relief valve compares a pressure upstream of the bleed valve to a pressure downstream of the bleed valve and in response to the downstream pressure exceeding the upstream pressure creates a fluid communication path between the servo pressure and an ambient pressure to decrease the servo pressure such that the bleed valve is closed.

DETAILED DESCRIPTION

A bleed valve system regulates bleed air provided from an upstream portion to a downstream portion. The downstream pressure is regulated via a servo pressure selectively applied to a valve actuator, which based on the servo pressure selectively open/closes the valve. A fault condition known as reverse flow occurs when pressure at the downstream pressure exceeds pressure at the upstream pressure, resulting in a reverse flow of fluid through the bleed valve, and potentially into the engine. The present invention utilizes a reverse flow relief valve connected to monitor and compare the upstream pressure to the downstream pressure. If the downstream portion exceeds the upstream pressure, then the reverse flow relief valve creates a fluid communication path between the servo pressure and an ambient pressure, thereby de-pressuring the servo pressure and causing the bleed valve to close.

Figure 1:
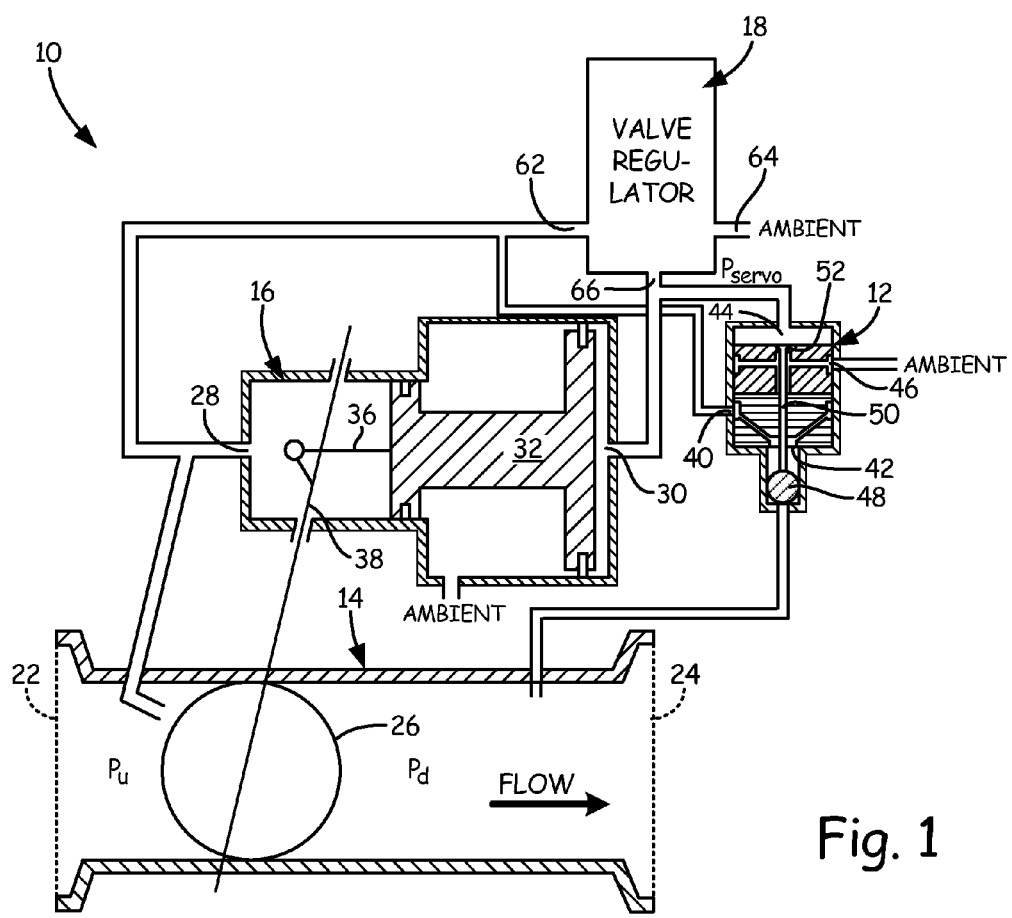
FIG. 1 is a schematic view of a bleed valve system that utilizes a reverse flow shut-off valve.

FIG. 1 is a schematic view of bleed valve system 10 that utilizes reverse flow shut-off valve 12 according to an embodiment of the present invention. Bleed valve system 10 includes bleed valve includes bleed valve portion 14, valve actuator 16, and valve regulator 18 in addition to reverse flow shut-off valve 12. Bleed valve portion 14 includes upstream inlet 22, downstream outlet 24, and valve 26. In one embodiment, valve 26 is a butterfly valve that is opened/closed selectively to regulate the supply of fluid from upstream inlet 22 to downstream outlet 24.

The actuation of valve 26 is controlled by valve actuator 16, which includes inlets 28 and 30, piston 32, stem 36 and linkage 38, wherein stem 36 and linkage 38 provide a mechanical connection between valve actuator 16 and valve 26. Piston 32 is slidably mounted within the housing of valve actuator 16. When in the closed position (as shown in FIG. 1), valve 26 is also closed. Valve actuator 16 compares the pressure of the upstream pressure (Pu) provided at inlet 28 with the servo pressure (Pservo) provided at inlet 30. The servo pressure Pservo actuates piston 32 to the left when the servo pressure Pservo is sufficient to overcome the valve closing forces from the upstream pressure Pu applied to the other side of piston 32 via inlet 28. Actuation of piston 32 in turn causes stem 36 and linkage 38 to move to either open or close valve 26. The surface area of the portion of the piston facing each inlet 28 and 30, determines the relative forces required between upstream pressure Pu provided at inlet 28 and servo pressure Pservo provided at inlet 30. That is, servo pressure Pservo is not required, necessarily, to exceed upstream pressure Pu, in order to actuate piston 32 to the left to open valve 26. However, as discussed in more detail with respect to reverse flow relief valve 12, reducing the servo pressure Pservo to an ambient pressure will result in valve 26 closing, thereby preventing the flow of fluid from upstream inlet 22 to downstream outlet 24, but also preventing reverse flow of fluid from downstream outlet 24 to upstream inlet 22.

Valve regulator 18 regulates servo pressure Pservo to regulate the flow of bleed air through valve 26. In the embodiment shown in FIG. 1, valve regulator selectively mixes upstream pressure Pu with ambient air Pamb to regulate the servo pressure to a desired level. In one embodiment, valve regulator 18 utilizes an electric motor to move a flapper and thereby modulate servo pressure Pservo, although in other embodiments other means, such as pneumatic control, may be utilized to selectively actuate the flapper.

During normal operation, valve regulator 18 controls the downstream pressure Pd by selectively regulating the servo pressure Pservo to open/close valve 26 and thereby selectively regulates the supply of bleed air from inlet 22 to outlet 24. However, fault conditions may occur in which upstream pressure Pu decreases (e.g., in response to the engine supplying bleed air failing), while downstream pressure Pd remains high (e.g., as a result of other engines supplying bleed air that maintains downstream pressure Pd at a minimum level). In this type of fault condition, it is important to close valve 26 to prevent reverse flow of fluid from outlet 24 to inlet 22. Reverse flow relief valve 12 acts to ensure that valve 26 closes in response to downstream pressure Pd exceeding upstream pressure Pu.

Figure 2A:
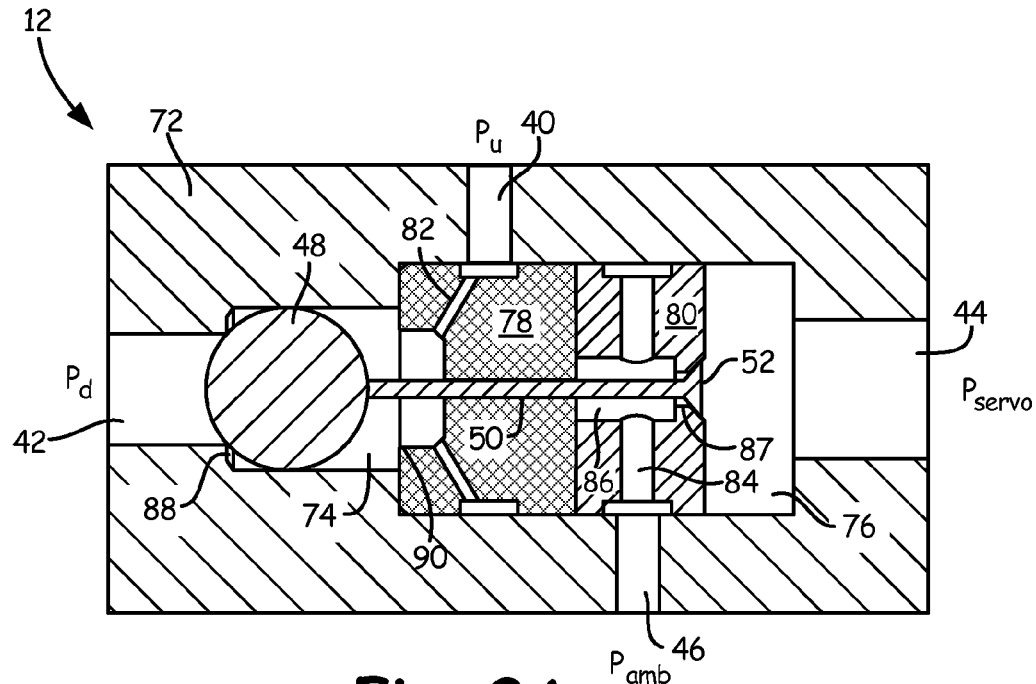
FIGS. 2A and 2B are cross-sectional views of a reverse flow shut-off valve according to an embodiment of the present invention.
Figure 2B:
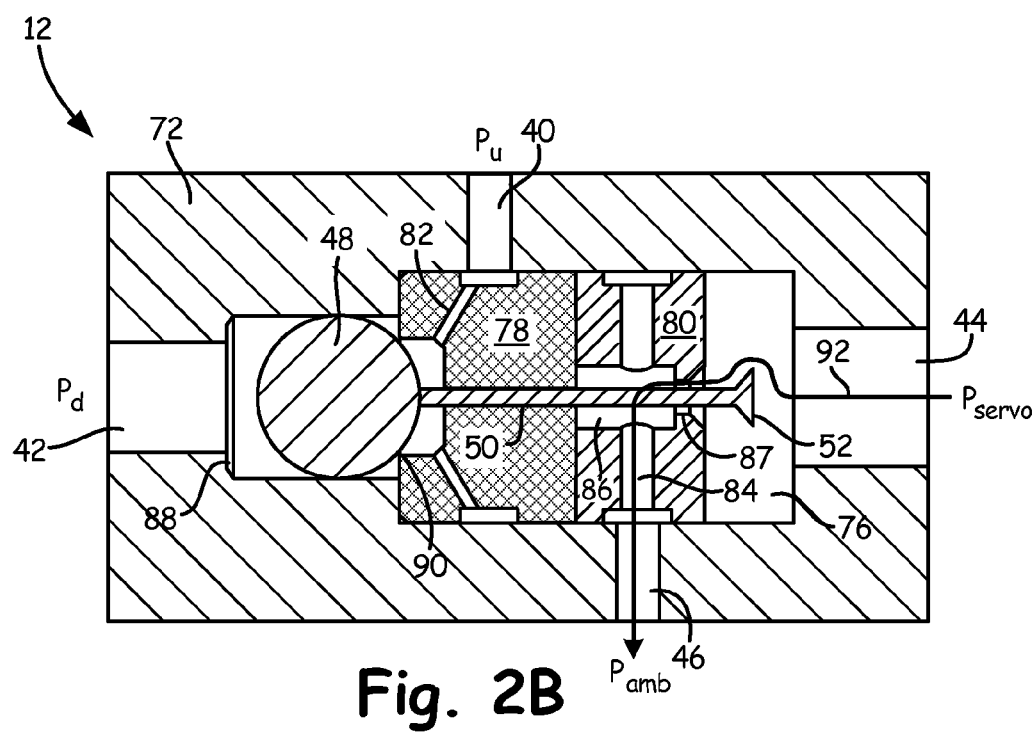

Reverse flow relief valve 12 is described in more detail with respect to FIGS. 2A and 2B. In general, reverse flow relief valve 12 includes inlets 40, 42, 44, and 46, and a poppet valve mechanism comprised of ball 48, stem 50, and poppet 52, although in other embodiments various other valve mechanisms may be employed. Upstream pressure Pu is provided to inlet 40. Downstream pressure Pd is provided to inlet 42. Servo pressure Pservo is provided to inlet 44, and inlet 46 is connected to ambient air. Reverse flow relief valve 12 compares the upstream pressure Pu to the downstream pressure Pd, with ball 48 being actuated based on whichever pressure is greater. Based on the actuation of ball 48, a fluid communication path is selectively created between inlet 44 and inlet 46. During normal operation, upstream pressure Pu provided to inlet 40 is greater than downstream pressure Pd provided at inlet 42, and the resultant position of ball 48, stem 50, and poppet 52 prevents fluid communication between servo pressure (provided at inlet 44) and ambient air (provided at inlet 46), as shown in FIG. 2A. As a result, servo pressure Pservo remains unchanged during normal operation, and operates as desired to actuate valve actuator 16.

During a fault condition, in which downstream pressure Pd is greater than upstream pressure Pu, ball 48, stem 50 and poppet 52 are actuated to create a fluid communication path between servo pressure Pservo (provided at inlet 44) and ambient air (provided at inlet 46), as shown in FIG. 2B. The creation of a fluid communication path between inlet 44 and inlet 46 causes the pressure associated with servo pressure Pservo to decrease as the pressure is vented to ambient via the fluid communication path. As a result of servo pressure Pservo decreasing, valve actuator 16 is moved to a closed position and valve 26 is closed. In this way, reverse flow relief valve 12 causes valve 26 to be closed to prevent reverse flow in response to the downstream pressure Pd exceeding the upstream pressure Pu.

In one embodiment reverse flow relief valve 12 utilizes only components capable of withstanding high temperatures. To accommodate high temperatures, all parts/components (e.g., ball, stem, poppet, housing, etc.) are comprised of ceramic and/or metal materials capable of withstanding high temperatures. As described in more detail with respect to FIGS. 2A and 2B, reverse flow relief valve 12 is designed to prevent leakage where undesirable without resorting to non-metal seals/diaphragms.

FIGS. 2A and 2B are cross-sectional views of reverse flow shut-off valve 12 according to an embodiment of the present invention. In FIG. 2A, reverse flow shut-off valve 12 is operating under normal conditions, in which upstream pressure Pu is greater than downstream pressure Pd, and as a result no fluid communication path is created between servo pressure Pservo and ambient pressure Pamb. In FIG. 2B, reverse flow shut-off valve 12 is operating under a fault condition in which downstream pressure Pd is greater than upstream pressure Pu. As a result, reverse flow shut-off valve 12 creates a flow path between servo pressure Pservo and ambient pressure Pamb to decrease the servo pressure Pservo and thereby close valve 26 (shown in Figure. 1).

In the embodiment shown in FIGS. 2A and 2B, reverse flow shut-off valve 12 includes housing 72, which includes a plurality of passages formed from an exterior portion of housing 72 toward an interior portion which serve as inlets 40, 42, 44, and 46. Within the interior of housing 72 are first and second chambers 74 and 76, respectively. First chamber 74 houses ball 48 (shown in FIG. 1 as well), while second chamber 76 houses stationary members 78 and 80. Stationary member 78 includes passageway 82, which forms a fluid communication path between inlet 40 (upstream pressure Pu) and first chamber 74. Stationary member 80 includes passageway 84, which forms a fluid communication path between inlet 46 and inner chamber 86 located within stationary member 80.

In the embodiment shown in FIGS. 2A and 2B, reverse flow shut-off valve 12 is a poppet valve, wherein ball 48, stem 50 and poppet 52 are actuated together to open/close the valve. Ball 48 is slidably mounted within first chamber 74. The actuation of ball 48 depends on the pressure difference between upstream pressure Pu (provided via inlet 40 and passageway 82 to the right-side of ball 48) and downstream pressure Pd (provided via inlet 42 to the left-side of ball 48).

When the upstream pressure Pu is greater than the downstream pressure Pd, as shown in FIG. 2A, the poppet valve is actuated to the left such that poppet 52 is pressed against seat portion 87 of stationary member 80 to prevent a fluid communication path being created between inlet 44 (servo pressure Pservo) and inlet 46 (ambient pressure Pamb). Servo pressure Pservo is therefore unchanged by reverse flow shut-off valve 12 and the valve actuator 16 (shown in FIG. 1) operates as normal.

In the embodiment shown in FIG. 2B, downstream pressure Pd exceeds upstream pressure Pu. As a result of the higher pressure provided at the left-side of ball 48 as compared with the right-side, ball 48 is actuated to the right along with stem 50 and poppet 52. By actuating poppet 52 to the right, a fluid communication path is created between servo pressure Pservo provided at inlet 44 and ambient pressure Pamb provided at inlet 46. The fluid communication path, indicated by arrow 92, vents the servo pressure Pservo to ambient air. The resultant decrease in servo pressure causes valve actuator 16 (shown in FIG. 1) to close valve 26 (also shown in FIG. 1).

In one embodiment, all components employed as part of reverse-flow relief valve 12 are made of components capable of withstanding high temperatures, such as metal and/or ceramic materials. However, as a result O-rings and other types of rubber/plastic seals typically used in valve applications cannot be employed. For example, downstream pressure Pd provided at the left-side of ball 48 must be sealed from leaking fluid to the right-side of ball 48. In the embodiment shown in FIGS. 2A and 2B, first chamber 74 includes a seating portion 88 shaped to receive ball 48 and create a seal between the left-side of ball 48 and the right-side of ball 48 when ball 48 is actuated to the left. Thus, when ball 48 is actuated to the left by an upstream pressure Pu that exceeds the downstream pressure Pd, ball 48 is seated within seat portion 88 to provide sealing between the left and right sides of ball 48.

Similarly, first stationary portion 78 includes another seat portion 90 for receiving ball 48 when actuated to the right by a downstream pressure Pd that exceeds the upstream pressure Pu. Seat portion 90 is annular and shaped to receive ball 48 such that a seal is created between the right and left sides of balls 48.

In addition, sealing must be provided between first chamber 74 and second chamber 76. The most likely place for leakage between these chambers is along the interface between first and second stationary members 78 and 80 and housing 72. In one embodiment, to prevent leakage along this interface, first and second stationary members 78 and 80 are press-fit within second chamber 76. For example, to install first stationary member 78 within second chamber 76, the component is cooled to shrink the component, and then fit within second chamber 76. When stationary member 78 returns to an ambient temperature, the component is press-fit within chamber 76 and provides a seal to prevent upstream pressure Pu from being leaked into second chamber 76. A similar press-fit operation may be performed with respect to second stationary member 80.

A final leakage path exists via the interface between stem 50 and first stationary member 78. Leakage via this path is minimized by maintaining a close fit between stem 50 and the central aperture formed within first stationary member 78, although stem 50 must remain capable of sliding axially within stationary member 78, and therefore cannot be press fit into place.

In this way, reverse flow leakage valve 12 provides a mechanism for preventing the undesirable reverse flow of a medium through a valve. In addition, reverse flow leakage valve 12 is capable of operating in high temperature environments, because the valve does not rely on rubber or other temperature intolerant components for forming seals within the valve.

The following are non-exclusive descriptions of possible embodiments of the present invention.

A reverse flow relief valve includes a housing, a first stationary member, a second stationary member, and a poppet mechanism. The housing is defined by first, second, third, and fourth fluid inlets, and a first chamber and a second chamber. The first stationary member is located within the second chamber that fits within the second chamber to provide a seal between the first chamber and the second chamber. The second stationary member is located within the second chamber adjacent to the first member, the second member having an interior chamber and a passage that places the fourth fluid inlet in fluid communication with the interior chamber. The poppet mechanism includes a ball, stem and poppet member, wherein the ball is located in the first chamber such that the first inlet is in fluid communication with a first side of the ball and the second inlet is in fluid communication with a second side of the ball, wherein the ball is actuated axially between a first position and a second position based on the relative pressures provided at the first inlet and the second inlet, wherein stem extends through the first stationary member and the second stationary member and the poppet member forms a seal with the second member when the ball is in a first position and provides a fluid communication path between the third inlet and the fourth inlet via the interior chamber of the second stationary member when the ball is in a second position.

The reverse flow relief valve of the preceding paragraph can optionally include, additionally and/or alternatively, any one or more of the following features, configurations, and/or additional components:

The first and second stationary members, the ball, and the stem member may be made of metal and/or ceramic material.

The first and second stationary members may be press-fit within the housing.

The housing may include a first seat portion that receives the ball when the ball is actuated toward the second inlet.

The first seat portion may form a seal between a left-side of the ball and a right-side of the ball when the ball is actuated against the first seat portion.

The first stationary member may include a second seat member that receives the ball when the ball is actuated toward the first inlet.

The seat portion may form a seal between the left-side of the ball and a right-side of the ball when the ball is actuated against the second seat portion.

A bleed valve system comprises a bleed valve, a valve regulator, a valve actuator, and a reverse flow relief valve. The bleed valve is opened and closed to control a flow of bleed air from an upstream inlet to a downstream outlet. The valve regulator provides a servo pressure used to regulate the position of the bleed valve. The valve actuator is mechanically connected to open/close the bleed valve based on the servo pressure provided by the valve regulator. The reverse flow relief valve compares a pressure upstream of the bleed valve to a pressure downstream of the bleed valve and in response to the downstream pressure exceeding the upstream pressure creates a fluid communication path between the servo pressure and an ambient pressure to decrease the servo pressure and cause the valve actuator to close the bleed valve.

The bleed valve system of the preceding paragraph can optionally include, additionally and/or alternatively, any one or more of the following features, configurations, and/or additional components:

The reverse flow relief valve may include a housing defined by first, second, third, and fourth fluid inlets, and a first chamber and a second chamber, wherein the first fluid inlet is connected to the upstream pressure, the second fluid inlet is connected to the downstream pressure, the third fluid inlet is connected to the servo pressure, and the fourth fluid inlet is connected to the ambient pressure. The reverse flow relief valve may further include a first stationary member located within the second chamber that fits within the second chamber to provide a seal between the first chamber and the second chamber. The reverse flow relief valve may further include a second stationary member located within the second chamber adjacent to the first member, the second member having an interior chamber and a passage that places the fourth fluid inlet in fluid communication with the interior chamber. The reverse flow relief valve further includes a poppet valve mechanism that includes a ball, stem and poppet member, wherein the ball is located in the first chamber such that the first inlet is in fluid communication with a first side of the ball and the second inlet is in fluid communication with a second side of the ball, wherein the ball is actuated axially between a first position and a second position based on the relative pressures provided at the first inlet and the second inlet, wherein stem extends through the first stationary member and the second stationary member and the poppet member forms a seal with the second member when the ball is in a first position and provides a fluid communication path between the third inlet and the fourth inlet via the interior chamber of the second stationary member when the ball is in a second position.

The first and second stationary members, the ball, and the stem member may be comprised of metal and/or ceramic.

The first and second stationary members may be press-fit within the housing.

The housing may include a first seat portion that receives the ball when the ball is actuated toward the second inlet.

The first seat portion may form a seal between a left-side of the ball and a right-side of the ball when the ball is actuated against the first seat portion.

The first stationary member may include a second seat member that receives the ball when the ball is actuated toward the first inlet.

The seat portion may form a seal between the left-side of the ball and a right-side of the ball when the ball is actuated against the second seat portion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A reverse flow relief valve comprising:
   a housing defined by first, second, third, and fourth fluid inlets, and a first chamber and a second chamber;
   a first stationary member located within the second chamber that fits within the second chamber to provide a seal between the first chamber and the second chamber;

a second stationary member located within the second chamber adjacent to the first stationary member, the second stationary member having an interior chamber and a passage that places the fourth fluid inlet in fluid communication with the interior chamber;

a poppet mechanism that includes a ball, stem and poppet member, wherein the ball is located in the first chamber such that the first inlet is in fluid communication with a first side of the ball and the second inlet is in fluid communication with a second side of the ball, wherein the ball is actuated axially between a first position and a second position based on the relative pressures provided at the first inlet and the second inlet, wherein the stem extends through the first stationary member and the second stationary member and the poppet member forms a seal with the second stationary member when the ball is in a first position and provides a fluid communication path between the third inlet and the fourth inlet via the interior chamber of the second stationary member when the ball is in a second position.

2. The reverse flow relief valve of claim 1, wherein the first and second stationary members, the ball, and the stem member are metal and/or ceramic.

3. The reverse flow relief valve of claim 1, wherein the first and second stationary members are press-fit within the housing.

4. The reverse flow relief valve of claim 1, wherein the housing includes a first seat portion that receives the ball when the ball is actuated toward the second inlet.

5. The reverse flow relief valve of claim 4, wherein the first seat portion forms a seal between a left-side of the ball and a right-side of the ball when the ball is actuated against the first seat portion.

6. The reverse flow relief valve of claim 1, wherein the first stationary member includes a second seat member that receives the ball when the ball is actuated toward the first inlet.

7. The reverse flow relief valve of claim 6, wherein the seat member forms a seal between the left-side of the ball and a right-side of the ball when the ball is actuated against the second seat member.

8. A bleed valve system comprising:
a bleed valve that is opened and closed to control a flow of bleed air from an upstream inlet to a downstream outlet;
a valve regulator that provides a servo pressure used to regulate the position of the bleed valve;
a valve actuator mechanically connected to open/close the bleed valve based on the servo pressure provided by the valve regulator; and
a reverse flow relief valve that compares a pressure upstream of the bleed valve to a pressure downstream of the bleed valve and in response to the downstream pressure exceeding the upstream pressure creates a fluid communication path between the servo pressure and an ambient pressure to decrease the servo pressure and cause the valve actuator to close the bleed valve.

9. The bleed valve system of claim 8, wherein the reverse flow relief valve includes:
a housing defined by first, second, third, and fourth fluid inlets, and a first chamber and a second chamber, wherein the first fluid inlet is connected to the upstream pressure, the second fluid inlet is connected to the downstream pressure, the third fluid inlet is connected to the servo pressure, and the fourth fluid inlet is connected to the ambient pressure;
a first stationary member located within the second chamber that fits within the second chamber to provide a seal between the first chamber and the second chamber;
a second stationary member located within the second chamber adjacent to the first stationary member, the second stationary member having an interior chamber and a passage that places the fourth fluid inlet in fluid communication with the interior chamber;
a poppet valve mechanism that includes a ball, stem and poppet member, wherein the ball is located in the first chamber such that the first inlet is in fluid communication with a first side of the ball and the second inlet is in fluid communication with a second side of the ball, wherein the ball is actuated axially between a first position and a second position based on the relative pressures provided at the first inlet and the second inlet, wherein the stem extends through the first stationary member and the second stationary member and the poppet member forms a seal with the second stationary member when the ball is in a first position and provides a fluid communication path between the third inlet and the fourth inlet via the interior chamber of the second stationary member when the ball is in a second position.

10. The bleed valve system of claim 9, wherein the first and second stationary members, the ball, and the stem member are metal and/or ceramic.

11. The bleed valve system of claim 9, wherein the first and second stationary members are press-fit within the housing.

12. The bleed valve system of claim 9, wherein the housing includes a first seat portion that receives the ball when the ball is actuated toward the second inlet.

13. The bleed valve system of claim 12, wherein the first seat portion forms a seal between a left-side of the ball and a right-side of the ball when the ball is actuated against the first seat portion.

14. The bleed valve system of claim 9, wherein the first stationary member includes a second seat member that receives the ball when the ball is actuated toward the first inlet.

15. The bleed valve system of claim 14, wherein the seat member forms a seal between the left-side of the ball and a right-side of the ball when the ball is actuated against the second seat member.

* * * * *